Patented Aug. 13, 1935

2,010,883

UNITED STATES PATENT OFFICE 2,010,883

PRODUCTION OF COLORATIONS ON MATERIALS MADE OF OR CONTAINING ORGANIC DERIVATIVES OF CELLULOSE

Henry Charles Olpin and George Holland Ellis, Spondon, near Derby, England, assignors to Celanese Corporation of America, a corporation of Delaware No Drawing. Application January 14, 1933, Serial No. 651,849. In Great Britain February 17, 1932

10 Claims. (Cl. 8—5)

This invention relates to the coloration of materials and more particularly to the production of colorations on materials made of or containing organic derivatives of cellulose.

In U. S. Patent No. 1,679,935 there is broadly described the use, in dyeing, printing, or stencilling cellulose acetate materials, of unsulphonated nitro derivatives of compounds containing two or more aryl radicles or aromatic residues, two of which are united by a single linkage not constituted by nitrogen alone.

It has now been found that particularly valuable colorations of excellent fastness may be produced on materials made of or containing cellulose esters or ethers by nitro-mono-amino derivatives of compounds containing two or more aryl radicles or aromatic residues, two of which are united by a single linkage not constituted by oxygen or nitrogen alone, and particularly by nitro-mono-amino-diphenyls and other nitro-mono-amino-diaryl compounds wherein the aryl groupings are not united by oxygen or nitrogen alone. Thus for example 3-nitro-4-amino-diphenyl and 3-nitro-4-amino-4'-chlor-diphenyl when applied to a cellulose actate material give yellow colorations which are not only of very good fastness to light, but are not readily volatilized, for example by steaming.

According to the present invention therefore colorations are produced on cellulose ester and ether materials by means of nitro-mono-amino-diphenyls and other nitro-mono-amino-diaryls and nitro-mono-amino derivatives of compounds containing two or more aryl radicles or aromatic residues, two of which are united by a single linkage not constituted by oxygen or nitrogen alone.

The dyestuffs employed in the production of colorations in accordance with the present invention may contain two or more aryl nuclei linked together directly as in diphenyl or other diaryl compounds or indirectly, for example, sulphur, —CH$^2$—, —CO—, —CONH$^2$—, —NH—CO—NH—, or other atom or group other than a single linkage constituted by oxygen or nitrogen alone. The aryl residues may contain more than one ring as for example in naphthalene, but preferably at least one aryl residue should be a phenyl residue, and especial mention is made of those dyestuffs in which all the aryl nuclei are phenyl residues.

The amino group of the nitro-mono-amino-diaryl compounds of the present invention may be substituted e. g. by alkyl or aryl groups which may themselves be substituted, but should preferably not be acylated. The nitro-mono-amino-diaryl compounds may or may not contain other substituent groups in the nuclei, for example halogen, hydroxy, alkoxyl, alkyl (as for example in the nitro-mono-amino-ditolyls), or acyl amino. Particular mention may be made of those compounds containing a nitro group in the same aryl nucleus as the amino group, and especially of compounds in which the amino group is in an ortho position to a nitro group. Examples of nitro-mono-amino-diaryl compounds which may be utilized in accordance with the present invention are, in addition to the 3-nitro-4-amino-diphenyl and 3-nitro-4-amino-4'-chlor-diphenyl mentioned above, 2'-nitro-4-amino-diphenyl, 4'-nitro-4-amino-diphenyl, 3: 4'-dinitro-4-amino-diphenyl, 3:3'-dinitro-4-amino-4'-chlor-diphenyl, 2-nitro-4-amino-4'-brom-diphenyl, 3-nitro-4-amino-2:2'-ditolyl, 3-nitro-4-amino-benzophenone, 2-nitro-2'-amino-benzophenone, 5-nitro-2-amino-benzanilide, 3-nitro-4-amino-benzophenone and the nitro-mono-amino-diphenyl methanes.

The dyestuffs of the present invention, which are preferably unsulphonated, may be applied to the materials by any desired means. It has been found convenient when applying them to cellulose derivative materials, however, to apply them in the form of dispersions prepared for example with the aid of one or more of the dispersing agents of U. S. Patents Nos. 1,618,413, 1,694,413, 1,690,481, 1,803,008, 1,840,572, 1,716,721, U. S. applications S. Nos. 390,423 and 390,424 both filed 4th September 1929 and British Patent No. 224,925, and the compositions containing these dyestuffs and dispersing agents with or without protective colloids and any other ingredients form an important feature of the present invention. If desired more or less concentrated preparations may be made up containing the dyestuffs, dispersing agents and any other desired ingredients, which preparations may be diluted when required for use.

The nitro derivatives may be applied to the goods according to any desired method, for example by dyeing, printing, or stencilling. For printing, the dyestuff preparations may be mixed with any suitable thickening agent such for example as gum arabic, dextrin, or the like, and the resultant paste applied by any convenient method of local application, for example by printing with engraved rollers or through stencils, and the prints afterwards dried, steamed and aged and finished as desired or requisite.

The dyestuffs of the present invention may be employed in conjunction with any other dyestuffs or coloring matters and any other substances according to the particular effects to be obtained. Furthermore, the dyestuffs of the present invention may be applied not only to the production of colorations on goods made of or containing cellulose acetate, formate, propionate, butyrate, or other cellulose ester, for example the materials known under the name "immunized cotton" prepared by the action of toluene sulphochloride on alkalized cotton, or cellulose ethers, such for example as methyl, ethyl, or benzyl cellulose, but they may be applied in the production of colorations on mixed materials containing the cellulose esters or ethers in admixture with each other and/or with animal or vegetable fibres.

The following examples illustrate the invention without being in any way limitative.

*Example 1*

1 kilogram of a paste consisting of 1 part of finely divided 3-nitro-4-amino-diphenyl, 6 parts of water and 3 parts of Turkey red oil (50%) is stirred with 10 litres of 2.5 grams per litre soap solution, the temperature being raised to the boiling point and the mixture then strained through a filter cloth into a dyebath containing 300 litres of 2.5 grams per litre soap solution.

10 kilograms of a previously scoured knitted fabric consisting of cellulose acetate is entered in rope form into the above dyebath in the cold and the temperature slowly raised to 80° C. and maintained at that point for about 1½ hours or until the requisite shade is achieved. The fabric is now washed thoroughly and dried or otherwise treated as may be desired or requisite, a bright pure yellow shade being obtained.

*Example 2*

500 grams of a paste consisting of 1 part of finely divided 3-nitro-4-amino-4'-chlor-diphenyl in 6 parts of water and 3 parts of dispersing agent prepared for example according to one of the methods of dispersion described in U. S. Patent No. 1,694,413, are heated to the boiling point with 5-10 litres of 2.5 grams per litre soap solution and strained through a filter cloth into a dyebath containing 300 litres of 2.5 grams per litre soap solution.

10 kilograms of a previously scoured mixed fabric consisting of cellulose acetate and cotton or viscose yarns are entered into the above dyebath and dyed under the conditions described in Example 1. The cotton is dyed with a direct cotton blue dye having no affinity for cellulose acetate either by adding the requisite color to the original dyebath or by the usual methods in a fresh bath, the temperature being regulated at 80° C. The goods are finally well washed and dried or otherwise treated as may be requisite or desired. A mixed coloration is obtained, the cellulose acetate portions of the material being dyed a bright yellow and the cellulosic fibre blue.

*Example 3*

1 kilogram of a 10% paste of finely comminuted 3-nitro-4-amino-2:2'-ditolyl is strained into a dyebath containing 300 litres of 2.5 grams per litre soap solution.

10 kilograms of a cellulose acetate knitted fabric are entered into this dyebath at 40°-45° C. and the temperature raised slowly to 80° C. and maintained at about that point until the requisite shade is achieved. The fabric is then washed off and dried or otherwise treated as may be desired or requisite, a bright yellow color being produced thereon.

What we claim and desire to secure by Letters Patent is:—

1. Process for the coloration of materials containing cellulose acetate, which comprises applying to the materials 3-nitro-4-amino-diphenyl.

2. Process for the coloration of materials containing cellulose acetate, which comprises applying to the materials 3-nitro-4-amino-4'-chlor-diphenyl.

3. Process for the coloration of materials containing cellulose acetate, which comprises applying to the materials 3-nitro-4-amino-2:2'-ditolyl.

4. Process for the coloration of materials containing an organic derivative of cellulose which comprises applying to the materials a diaryl containing a single amino group and a single nitro group, said groups being in ortho relationship to each other.

5. Process for the coloration of materials containing an organic derivative of cellulose which comprises applying to the materials an unsulphonated diaryl containing a single amino group and a single nitro group, said groups being in ortho relationship to each other.

6. Process for the coloration of materials containing an organic derivative of cellulose which comprises applying to the materials an unsulphonated diphenyl containing a single amino group and a single nitro group, said groups being in ortho relationship to each other.

7. Process for the coloration of materials containing cellulose acetate which comprises applying to the materials a diaryl containing a single amino group and a single nitro group, said groups being in ortho relationship to each other.

8. Process for the coloration of materials containing cellulose acetate which comprises applying to the materials an unsulphonated diaryl containing a single amino group and a single nitro group, said groups being in ortho relationship to each other.

9. Process for the coloration of materials containing cellulose acetate which comprises applying to the materials an unsulphonated diphenyl containing a single amino group and a single nitro group, said groups being in ortho relationship to each other.

10. Process for the production of colorations on materials containing cellulose acetate which comprises applying to the materials in dispersed form, an unsulphonated diaryl containing a single amino group and a single nitro group, said groups being in ortho relationship to each other.

HENRY CHARLES OLPIN.
GEORGE HOLLAND ELLIS.